United States Patent
Okada (10) Patent No.: US 9,557,180 B2
(45) Date of Patent: Jan. 31, 2017

(54) VEHICLE POSITION DETECTION DEVICE AND PROGRAM

(71) Applicant: Clarion Co., Ltd., Saitama-shi, Saitama (JP)

(72) Inventor: Kazuhiro Okada, Ebina (JP)

(73) Assignee: Clarion Co., Ltd., Saitama-shi (JP)

( * ) Notice: Subject to any disclaimer, the term of this patent is extended or adjusted under 35 U.S.C. 154(b) by 58 days.

(21) Appl. No.: 14/404,412

(22) PCT Filed: Apr. 30, 2013

(86) PCT No.: PCT/JP2013/062629
§ 371 (c)(1),
(2) Date: Nov. 26, 2014

(87) PCT Pub. No.: WO2013/179852
PCT Pub. Date: Dec. 5, 2013

(65) Prior Publication Data
US 2015/0338222 A1  Nov. 26, 2015

(30) Foreign Application Priority Data

May 29, 2012  (JP) ................................. 2012-121729

(51) Int. Cl.
*G01C 21/30* (2006.01)
*G08G 1/0969* (2006.01)
(Continued)

(52) U.S. Cl.
CPC ............... *G01C 21/30* (2013.01); *G01C 21/10* (2013.01); *G06T 7/004* (2013.01); *G08G 1/0969* (2013.01); *G09B 29/10* (2013.01)

(58) Field of Classification Search
CPC ..... G06T 7/004; G01C 21/0005; G01C 21/10; G01C 21/30
See application file for complete search history.

(56) References Cited

U.S. PATENT DOCUMENTS 8,301,369 B2   10/2012   Hiruta et al.
2006/0047423 A1*   3/2006   Min .................. G01C 21/30
                                                    701/533
(Continued)

FOREIGN PATENT DOCUMENTS

EP   2 224 208 A2   9/2010
EP   2 264 404 A2   12/2010
(Continued)

OTHER PUBLICATIONS

International Search Report dated Jul. 23, 2013 with English translation (Two (2) pages).
(Continued)

*Primary Examiner* — Thomas G Black
*Assistant Examiner* — Sze-Hon Kong
(74) *Attorney, Agent, or Firm* — Crowell & Moring LLP (57) ABSTRACT

Free state determination at a high precision is made by using a simpler mechanism. A vehicle position detection device is configured to: store conditional probability information which associates each of values to be taken in vehicle information on a state of an own vehicle, a matching conditional probability that the value occurs in a matching state, and a free conditional probability that the value occurs in a free state; use the conditional probability information to acquire the matching conditional probability and the free conditional probability corresponding to the acquired value of the vehicle information; calculate a probability index in the matching state and a probability index in the free state based on the conditional probabilities; and determine which state is to be selected based on the probability index in the matching state and the probability index in the free state.

17 Claims, 9 Drawing Sheets

(51) Int. Cl.
*G01C 21/10* (2006.01)
*G06T 7/00* (2006.01)
*G09B 29/10* (2006.01)

(56) References Cited

U.S. PATENT DOCUMENTS

| | | | |
|---|---|---|---|
| 2007/0198177 A1 | 8/2007 | Yamada | |
| 2010/0121518 A1* | 5/2010 | Tiernan | G01C 21/30 |
| | | | 701/26 |
| 2010/0217522 A1* | 8/2010 | Ando | G01S 19/49 |
| | | | 701/532 |
| 2011/0208496 A1 | 8/2011 | Bando et al. | |
| 2012/0109517 A1* | 5/2012 | Watanabe | G01C 21/28 |
| | | | 701/431 |
| 2013/0080047 A1* | 3/2013 | Kobayashi | G06K 9/00805 |
| | | | 701/409 |
| 2013/0268232 A1* | 10/2013 | Poduri | H04W 4/028 |
| | | | 702/150 |

FOREIGN PATENT DOCUMENTS

| | | |
|---|---|---|
| JP | 11-325931 A | 11/1999 |
| JP | 2007-24701 A | 2/2007 |
| JP | 2011-2324 A | 1/2011 |
| JP | 2011-174771 A | 9/2011 |

OTHER PUBLICATIONS

Extended European Search Report issued in counterpart European Application No. 13798105.6 dated Jan. 5, 2016 (eight (8) pages).

* cited by examiner

410 CONDITIONAL PROBABILITY INFORMATION ON POSITION ERROR

| | POSITION ERROR (m) | 0~2 | 2~4 | 4~6 | 6~8 | 8~10 | 10~12 | 12~14 | 14~16 | 16~18 | 18~20 | 20~ |
|---|---|---|---|---|---|---|---|---|---|---|---|---|
| 4101 | | | | | | | | | | | | |
| 4102 | PROBABILITY IN MATCHING STATE (%) | 59.24 | 22.012 | 10.035 | 4.2151 | 1.8864 | 1.1012 | 0.6201 | 0.3101 | 0.26 | 0.1702 | 0.1495 |
| 4103 | PROBABILITY IN FREE STATE (%) | 2.9071 | 1.7422 | 2.3105 | 3.7175 | 3.7745 | 7.1694 | 8.6323 | 11.376 | 12.644 | 16.384 | 29.342 |

FIG. 5

411 CONDITIONAL PROBABILITY INFORMATION ON GPS RECEPTION STATE (NUMBER OF TIMES OF CONTINUOUS POSITIONING)

| | NUMBER OF TIMES OF CONTINUOUS POSITIONING | 0~20 | 21~40 | 41~60 | 61~80 | 81~100 | 100~120 | 121~ |
|---|---|---|---|---|---|---|---|---|
| 4111 | | | | | | | | |
| 4112 | PROBABILITY IN MATCHING STATE (%) | 4.1521 | 3.1252 | 2.035 | 2.1151 | 2.8864 | 3.215 | 82.471 |
| 4113 | PROBABILITY IN FREE STATE (%) | 73.154 | 4.4247 | 4.4247 | 7.5844 | 2.1247 | 5.681 | 2.6063 |

FIG. 6

412 CONDITIONAL PROBABILITY INFORMATION ON ROAD SURFACE INCLINATION ANGLE (ABSOLUTE VALUE)

| | ROAD SURFACE INCLINATION | 0~2 | 2~4 | 4~6 | 6~8 | 8~10 | 10~12 | 12~14 | 14~16 | 16~ |
|---|---|---|---|---|---|---|---|---|---|---|
| 4121 | | | | | | | | | | |
| 4122 | PROBABILITY IN MATCHING STATE (%) | 69.247 | 11.002 | 10.035 | 3.354 | 2.215 | 2.111 | 1.151 | 0.027 | 0.858 |
| 4123 | PROBABILITY IN FREE STATE (%) | 53.142 | 12.412 | 6.612 | 5.289 | 3.143 | 4.018 | 4.957 | 5.816 | 4.611 |

FIG. 7

420 DISPLAY TRANSITION PROBABILITY INFORMATION

| TRANSITION RELATIONSHIP BETWEEN DISPLAY STATES 421 | TRANSITION PROBABILITY 422 |
|---|---|
| MATCHING STATE →FREE STATE | *** |
| MATCHING STATE →MATCHING STATE | *** |
| FREE STATE →MATCHING STATE | *** |
| FREE STATE →FREE STATE | *** |

FIG. 8

430 DISPLAY OCCURRENCE PROBABILITY INFORMATION

| DISPLAY STATE (431) | OCCURRENCE PROBABILITY (432) |
|---|---|
| MATCHING STATE | *** |
| FREE STATE | *** |

FIG. 9

FREE STATE DETERMINATION PROCESSING

VEHICLE POSITION DETECTION DEVICE AND PROGRAM

TECHNICAL FIELD

The present invention relates to a vehicle position detection device and a program. The present invention claims priority to Japanese Patent Application No. 2012-121729 filed on May 29, 2012, the content of which is incorporated by reference herein in designated states where the incorporation of documents by reference is approved.

BACKGROUND ART

Map matching processing of acquiring an own vehicle position (for example, referred to as "map matching position") on a road link in map data is carried out in a navigation device used for a mobile body such as a vehicle.

For example, an own vehicle position (for example, referred to as "estimated position") and an own vehicle direction, which are calculated based on data output from a vehicle speed sensor and a gyro sensor, and map data are used in the map matching processing. Then, for example, a link having a position error between the estimated position and a candidate position on the link, and a direction error between the own vehicle direction and a link direction respectively satisfying predetermined conditions is selected as a map matching subject. Moreover, a likelihood (also referred to as "evaluation value", "confidence", or the like) is acquired by means of a predetermined likelihood function for each link subject to the map matching, or for a candidate position on each link, and a map matching position is acquired on a link high in the likelihood. For example, such a description that a likelihood of an own vehicle position on a road link is calculated based on an own vehicle position and an error covariance exists in Patent Literature 1.

Moreover, when a graphic (for example, referred to as "car mark") representing a current position is displayed in the navigation device, a determination (hereinafter also referred to as "free state determination") of whether the graphic is displayed at a position acquired by the map matching or a position acquired without the map matching is made. It should be noted that the display state with the map matching is referred to as "matching state", and the display state without the map matching is referred to as "free state".

A condition determination by using respective parameters of the own vehicle such as the position error, the direction error, and a GPS reception state, and thresholds for the respective parameters is made in the free state determination.

CITATION LIST

Patent Literature

[PTL 1] JP 2011-2324 A

SUMMARY OF INVENTION

Technical Problems

However, the free state determination by using a condition combining the plurality of thresholds is complex, and has the following problems.

First, optimization of the respective thresholds and optimization of the condition combining the respective thresholds are necessary for increasing the precision of the free state determination. However, determination of the optimal values and condition while any positions at which the vehicle travels are considered is difficult in reality. Moreover, the condition needs to be determined by combining the plurality of thresholds in order to increase the determination precision, but as the number of thresholds increases, the determination processing becomes complex. Moreover, when a new determination condition is to be added or to be deleted, simple addition or deletion of the threshold does not bring about an optimal condition, and necessity of adjusting the respective thresholds and the like are generated.

Therefore, it is an object of the present invention to make a precise free state determination by using a simpler mechanism.

Solution to Problems

The present application includes a plurality of pieces of means for solving at least a part of the problems, and a description is now given of the examples.

According to one embodiment of the present invention, there is provided a vehicle position detection device, including: a vehicle information acquisition part for acquiring vehicle information on a state of an own vehicle; a conditional probability information storage part for storing conditional probability information for associating each of values to be taken in the vehicle information, a matching conditional probability that the each of the values occurs in a matching state where a position of the vehicle is map-matched to a link, and a free conditional probability that the each of the values occurs in a free state where the position of the vehicle is not map-matched to a link with one another; a probability index calculation part for using the conditional probability information to acquire the matching conditional probability and the free conditional probability corresponding to a value of the vehicle information acquired by the vehicle information acquisition part, calculating a probability index in the matching state based on the acquired matching conditional probability, and calculating a probability index in the free state based on the acquired free conditional probability; and a state determination part for determining which state is to be selected based on the probability index in the matching state and the probability index in the free state calculated by the probability index calculation part.

Problems, configurations, and effects other than those described before become apparent from a description of an embodiment below.

DESCRIPTION OF EMBODIMENT

A description is now given of an embodiment of the present invention referring to the drawings.

Figure 1:
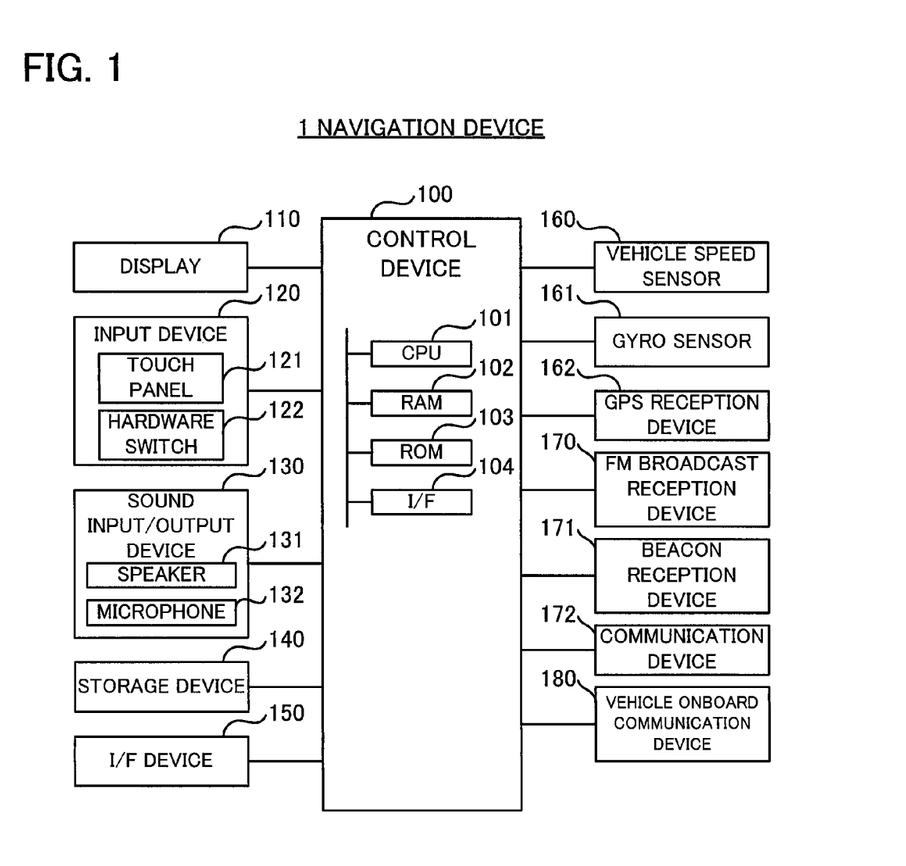
FIG. 1 is a schematic diagram of a navigation device 1 according to an embodiment of the present invention.

FIG. 1 is a schematic diagram of a navigation device 1 according to this embodiment of the present invention. As illustrated, the navigation device 1 includes a control device 100, a display 110, an input device 120 (a touch panel 121 and a hardware switch 122), a sound input/output device 130 (a speaker 131 and a microphone 132), a storage device 140, an interface (I/F) device 150, a vehicle speed sensor 160, a gyro sensor 161, a global positioning system (GPS) reception device 162, an FM broadcast reception device 170, a beacon reception device 171, a communication device 172, and a vehicle onboard communication device 180.

The control device 100 is a unit for executing a predetermined program to control the various devices of the navigation device 1 in a unified manner, thereby realizing various functions as a navigation device.

The control device 100 includes, for example, a central processing unit (CPU) 101 for carrying out various operations, a random access memory (RAM) 102 for storing programs subject to execution and data, a read only memory (ROM) 103 for storing programs and data in advance, and an interface (I/F) 104 for controlling other devices.

The display 110 is a unit for displaying graphics information generated by the control device 100. The display 110 is, for example, a liquid crystal display or an organic EL (electro-luminescence) display.

The input device 120 is a unit for receiving an instruction of a user by means of an operation by the user. The input device 120 is constituted by the touch panel 121, the hardware switch 122, and the like.

The touch panel 121 is, for example, a transparent operation panel bonded to a display surface of the display 110. The touch panel 121 identifies a touch position corresponding to X and Y coordinates of an image displayed on the display 110, converts the touch position into the coordinates, and outputs the coordinates to the control device 100. The touch panel 121 is constructed by, for example, a pressure-sensitive or electrostatic input detection element. The hardware switch 122 is, for example, a dial switch, a scroll key, a keyboard, and a button.

The sound input/output device 130 includes the speaker 131 as a sound output device and the microphone 132 as a sound input device. The speaker 131 outputs an audio signal generated by the control device 100. The microphone 132 acquires a sound external to the navigation device 1 such as a speech uttered by the user or other passengers, and outputs the sound to the control device 100.

The speaker 131 and the microphone 132 are, for example, independently installed at predetermined portions of the vehicle. Moreover, the speaker 131 and the microphone 132 may be stored in an integrated housing. Moreover, the navigation device 1 may include a plurality of speakers 131 and a plurality of microphones 132.

The storage device 140 stores programs and data required for the control device 100 to carry out various processing. These pieces of information are read onto the RAM 102 and used by the CPU 101. The storage device 140 is constituted by, for example, a hard disk drive (HDD). The storage device 140 may be a drive for reading a portable storage medium such as a DVD-ROM, a flash ROM, and a solid state drive (SSD).

Figure 2:
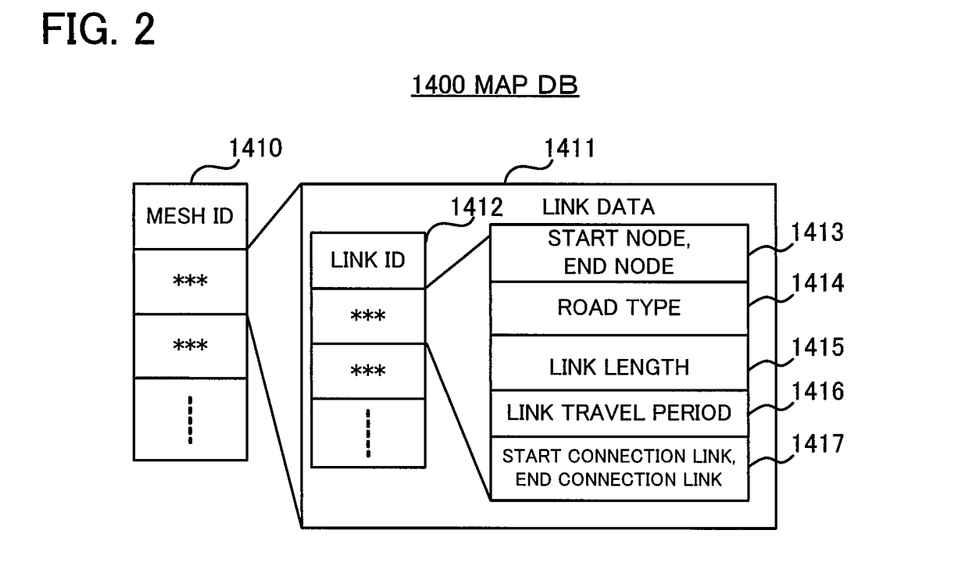
FIG. 2 is a schematic diagram of a map DB 1400.

The storage device 140 stores, for example, a map data base (DB) 1400 as illustrated in FIG. 2 (schematic diagram of the map DB 1400). The map DB 1400 includes, for each identification code (mesh ID) 1410 of a mesh which is an area delimited on the map, link data 1411 for each of links constituting roads included in the mesh area. The link data 1411 includes, for each identification code (link ID) 1412 for the link, coordinate information 1413 on two nodes (start node and end node) constituting this link, type information 1414 representing a type (such as a toll road or a general road) of a road including this link, link length information 1415 representing a length of this link, a link travel period 1416 of this link, and link IDs (connection link IDs) 1417 for respective links connected to the two nodes. The link data 1411 may include link direction information representing a direction of this link, and road width information representing a road width of the road including this link.

The above-mentioned configuration of the map DB 1400 is an example, and the present invention is not limited to the above-mentioned configuration. Moreover, information included in a general map DB is not excluded. For example, facility information, map drawing data, and image data for map components such as facilities may be included in the map DB 1400.

Referring back to FIG. 1, the I/F device 150 is a device for a connection to an external device such as a portable terminal and a portable storage medium to transmit or receive information. The I/F device 150 is, for example, a universal serial bus (USB) interface.

The vehicle speed sensor 160, the gyro sensor 161, and the GPS reception device 162 are used to detect a current position and the like of the mobile body. These devices may be connected via the vehicle onboard communication device 180 and a vehicle onboard communication network (not shown) to the control device 100.

The vehicle speed sensor 160 is a sensor for outputting vehicle speed data used for calculating a vehicle speed. The gyro sensor 161 is a sensor constituted by an optical fiber gyro or an oscillation gyro, for detecting an angular velocity caused by a rotation of the mobile body. The GPS reception device 162 measures a current position and a travel speed of a mobile body by receiving a signal from a GPS satellite, and measuring a distance between the mobile body and the GPS satellite and a change rate of the distance for each of three or more satellites. The various data detected in this way is transmitted to the control device 100, and is then used.

The FM broadcast reception device 170 receives a radio wave transmitted from an FM station. The FM broadcast reception device 170 receives, for example, outline current traffic information, traffic control information, service area/parking area (SA/PA) information, disaster information, and the like.

The beacon reception device 171 is a device for receiving a radio wave transmitted from a beacon device installed on a road. The beacon reception device 171 receives, for example, current traffic information, traffic control information, SA/PA information, disaster information, and the like.

The communication device 172 is a device connected via a wireless communication with a network, for transmitting or receiving information. The communication device 172 receives, for example, traffic information, traffic control information, SA/PA information, disaster information, and the like from a server on the network.

The vehicle onboard communication device 180 is a device connected to the vehicle onboard communication network for communication. The vehicle onboard communication device 180 is connected to an electronic control unit (ECU) (not shown), for example, for receiving various information. The vehicle onboard communication network is a network compliant with a standard such as the controller area network (CAN) and the FlexRay (trademark).

A configuration of the navigation device 1 in FIG. 1 illustrates an example of a main configuration for the sake of description of characteristics of the present invention, and the present invention is not limited to the above-mentioned configuration. Moreover, the configuration does not exclude a configuration provided for an ordinary navigation device.

Figure 3:
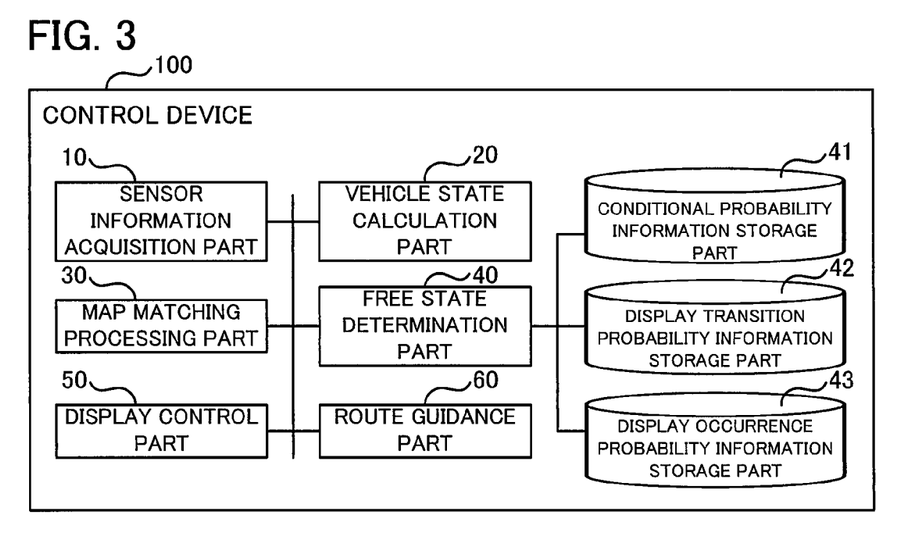
FIG. 3 is a schematic diagram relating to functions of a control device 100.

FIG. 3 is a schematic diagram of a functional configuration of the control device 100. As illustrated, the control device 100 includes a sensor information acquisition part 10, a vehicle state calculation part 20, a map matching processing part 30, a free state determination part 40, a conditional probability information storage part 41, a display transition probability information storage part 42, a display occurrence probability information storage part 43, a display control part 50, and a route guidance part 60.

The respective functional parts can be realized by, for example, loading predetermined programs stored in the storage device 140 on the RAM 102, and executing the loaded programs by the CPU 101. The conditional probability information storage part 41, the display transition probability information storage part 42, and the display occurrence probability information storage part 43 may be realized by, for example, the CPU 101 using the RAM 102 or the storage device 140.

For example, the predetermined program may be downloaded via the communication device 172 from a network to the storage device 140, then may be loaded on the RAM 102, and may be executed by the CPU 101. Moreover, the predetermined program may be directly loaded via the communication device 172 from the network on the RAM 102, and may be executed by the CPU 101. Moreover, for example, the predetermined program may be loaded from a storage medium connected to the I/F device 150 on the storage device 140 or the RAM 102.

The sensor information acquisition part 10 acquires and stores the various data output from the vehicle speed sensor 160, the gyro sensor 161, and the GPS reception device 162 at a predetermined timing (such as at every predetermined distance).

The vehicle state calculation part 20 calculates an own vehicle position (estimated position), an own vehicle direction, an own vehicle speed, a road surface inclination angle, and an altitude change amount on a plane coordinate at a predetermined timing (such as at every predetermined distance) based on the various data acquired by the sensor information acquisition part 10. The calculation of these parameters relating to the vehicle state can be realized by an existing method, and a description thereof is therefore omitted.

The map matching processing part 30 uses the respective parameters calculated by the vehicle state calculation part 20 and the map DB 1400 to identify the map matching position at a predetermined timing (such as at every predetermined distance). The identification of the map matching position can be realized by an existing method, and a detailed description thereof is therefore omitted.

For example, the map matching processing part 30 refers to the map DB 1400 to extract links within a predetermined range from the own vehicle position calculated by the vehicle state calculation part 20, and within a predetermined angle of a directional error from the own vehicle direction calculated by the vehicle state calculation part 20, and calculates candidate positions on the extracted links. The map matching processing part 30 uses a predetermined likelihood function to calculate a likelihood of the candidate position based on an direction error between the own vehicle direction and a link direction of the link on which the candidate position exists and a position error which is a distance from the own vehicle position to the link on which the candidate position exists for each of the candidate positions. Then, the map matching processing part 30 identifies the map matching position out of the respective candidate positions based on the likelihoods of the respective candidate positions. For example, the candidate position having the highest likelihood is identified as the map matching position.

The free state determination part 40 determines whether the current position is to be displayed at the map matching position calculated by the map matching processing part 30 or the own vehicle position calculated by the vehicle state calculation part 20 at a predetermined timing (such as at every predetermined distance). According to this embodiment, the free state determination part 40 converts the values of the various parameters relating to the vehicle state into probabilities for the respective display states (the matching state and the free state), and makes the determination based on the probabilities.

Therefore, the free state determination part 40 uses probability information stored in advance in the conditional probability information storage part 41, the display transition probability information storage part 42, and the display occurrence probability information storage part 43.

The conditional probability information storage part 41 stores conditional probability information for identifying probabilities that the values of the respective various parameters relating to the state of the vehicle occur in the respective states (conditions) of the matching state and the free state. The various parameters relating to the state of the vehicle include the position error, the direction error, the likelihood, a GPS reception state (number of times of continuous positioning), a GPS signal strength, the vehicle speed, the altitude, and the road surface inclination angle according to this embodiment.

The above-mentioned various parameters are examples, and other parameters may be included. Moreover, all of these parameters do not need to be used, and one or more of these parameters may be used.

Figure 4:
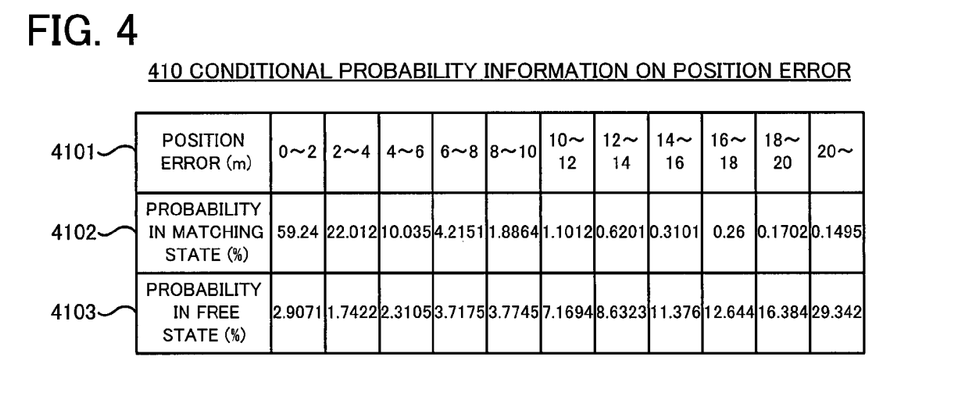
FIG. 4 shows conditional probability information 410 on a position error.

For example, as shown in FIG. 4 (conditional probability information 410 on the position error), regarding the conditional probability information on the position error, the value which the position error can take is partitioned into one or more ranges 4101, and a probability 4102 that a value included in each of the partitioned ranges 4101 appears in the matching state and a probability 4103 that a value included in the range appears in the free state are associated with each of the partitioned ranges 4101. In FIG. 4, the position error is partitioned into eleven ranges.

Figure 5:
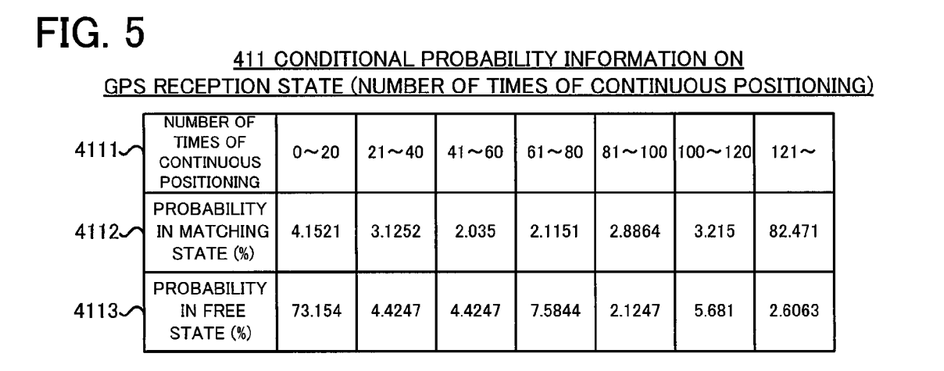
FIG. 5 shows conditional probability information 411 on a GPS reception state (number of times of continuous positioning).

For example, as shown in FIG. 5 (showing conditional probability information 411 on the GPS reception state (number of times of continuous positioning)), regarding the conditional probability information on the GPS reception state (number of times of continuous positioning), the value which the number of times of continuous positioning can take is partitioned into one or more ranges 4111, and a probability 4112 that a value included in each of the partitioned ranges 4111 appears in the matching state and a probability 4113 that a value included in the range appears in the free state are associated with each of the partitioned ranges 4111. In FIG. 5, the number of times of continuous positioning is partitioned into seven ranges.

Figure 6:
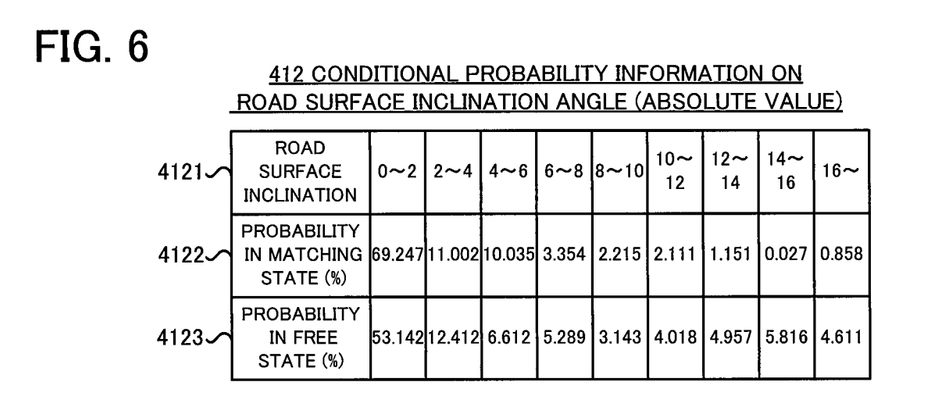
FIG. 6 shows conditional probability information 412 on a road surface inclination angle (absolute value).

For example, as shown in FIG. 6 (showing conditional probability information 412 on the road surface inclination angle (absolute value)), regarding the conditional probability information on the road surface inclination angle, the value which the absolute value of the road surface inclination angle can take is partitioned into one or more ranges 4121, and a probability 4122 that a value included in each of the partitioned ranges 4121 appears in the matching state and a probability 4123 that a value included in the range appears in the free state are associated with each of the partitioned ranges 4121. In FIG. 6, the absolute vale of the road surface inclination angle is partitioned into nine ranges.

The conditional probability information of the other parameters (direction error, likelihood, GPS signal strength, vehicle speed, and altitude) are not shown, but have the same configuration as in FIGS. 4 to 6. In other words, the value which the parameter can take is partitioned into one or more ranges, and, for each of the partitioned ranges, the probability that a value included in the range appears in the matching state and the probability that the value included in the range appears in the free state are associated with each of the ranges.

The conditional probability information on each of the parameters is generated in advance based on the data acquired by summing actual travel data of the vehicle, and is stored in the navigation device 1. For example, regarding the position error, the numbers of pieces of position error data included in the respective ranges respectively in the matching state and the free state are acquired based on the travel data. Then, for each of the ranges, the probability in the range is calculated by dividing the number included in the range by a total number in all of the ranges each in the matching state and the free state. The probabilities may be calculated by acquiring a position error theoretically occurring when the vehicle travels, and adding the numbers thereof to the respective ranges in addition to or in place of the position error data included in the travel data. The conditional probability information can be generated by the same method for the other parameters.

The display transition probability information storage part 42 stores display transition probability information for identifying probabilities that each of the display states (matching state and free state) transitions to other display states (including the same display state).

Figure 7:
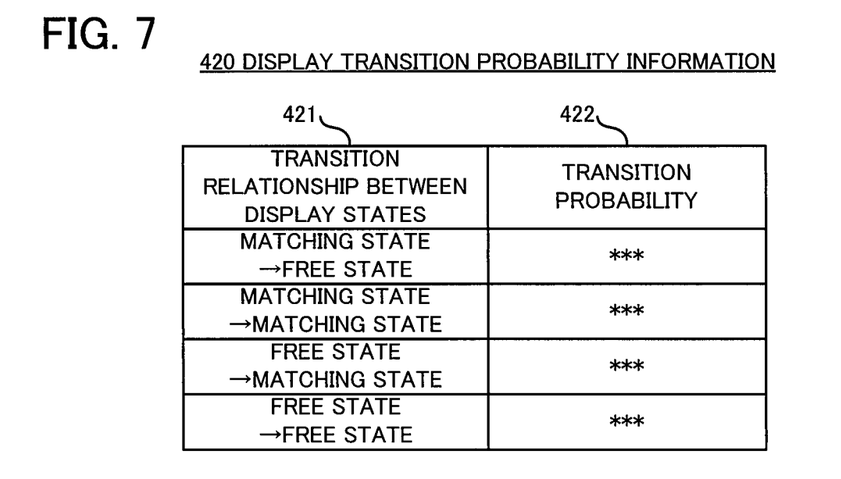
FIG. 7 shows display transition probability information 420.

For example, as shown in FIG. 7 (showing display transition probability information 420), regarding the display transition probability information, a probability 422 that a transition relationship of the display state occurs is associated with each information 421 for identifying the transition relationship. The transition relationships include a transition from the matching state to the free state, a transition from the matching state to the matching state, a transition from the free state to the matching state, and a transition from the free state to the free state.

On this occasion, a probability P(transition from state A to state B), which corresponds to transition from a state A (matching state) to a state B (free state), is determined by EQUATION (1).

$$P(\text{transition from state } A \text{ to state } B) = 1/(\text{number of times of continuous occurrence of state } A \text{ until state } B \text{ occurs}) \quad \text{EQUATION (1)}$$

Similarly, a probability P(transition from state B to state A) is determined by EQUATION (2).

$$P(\text{transition from state } B \text{ to state } A) = 1/(\text{number of times of continuous occurrence of state } B \text{ until state } A \text{ occurs}) \quad \text{EQUATION (2)}$$

Further, a probability P (transition from state A to state A) is determined by EQUATION (3).

$$P(\text{transition from state } A \text{ to state } A) = 1 - P(\text{transition from state } A \text{ to state } B) \quad \text{EQUATION (3)}$$

Similarly, a probability P(transition from state B to state B) is determined by EQUATION (4).

$$P(\text{transition from state } B \text{ to state } B) = 1 - P(\text{transition from state } B \text{ to state } A) \quad \text{EQUATION (4)}$$

The display transition probability information 420 is generated in advance based on the data acquired by summing actual travel data of the vehicle, and is stored in the navigation device 1. For example, at least one period in which the state A is continuously occurring until the state B occurs is identified by analyzing occurrence states of the matching state and the free state based on the travel data, and an average of the numbers of times of continuous occurrence in the respective identified periods is set as "number of times of continuous occurrence of state A until state B occurs". Then, the probabilities of the respective transition relationships are acquired based on the above-mentioned equations. The probabilities may be calculated by acquiring occurrence states of the matching state and the free state which theoretically occur when the vehicle travels in addition to or in place of the occurrence states of the matching state and the free state based on the travel data.

The display occurrence probability information storage part 43 stores display occurrence probability information for identifying probabilities that each of the display states (matching state and free state) occurs.

Figure 8:
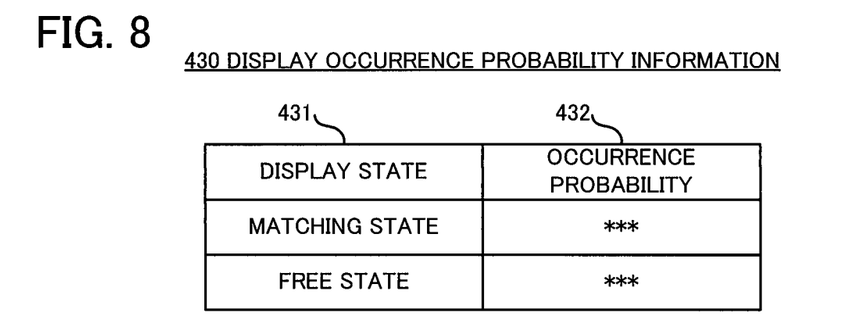
FIG. 8 shows display occurrence probability information 430.

For example, as shown in FIG. 8 (showing display occurrence probability information 430), regarding the display occurrence probability information, a probability 432 that a display state occurs is associated with each display state 431.

On this occasion, a probability P(occurrence of state A) that the state A occurs is determined by EQUATION (5).

$$P(\text{occurrence of state } A) = (\text{number of times of occurrence of state } A)/(\text{sum of numbers of times of occurrence of state } A \text{ and state } B) \quad \text{EQUATION (5)}$$

Similarly, a probability P(occurrence of state B) that the state B occurs is determined by EQUATION (6).

$$P(\text{occurrence of state } B) = (\text{number of times of occurrence of state } B)/(\text{sum of numbers of times of occurrence of state } A \text{ and state } B) \quad \text{EQUATION (6)}$$

The display occurrence probability information 430 is generated in advance based on the data acquired by summing actual travel data of the vehicle, and is stored in the navigation device 1. For example, the number of times of occurrence of the state A, the number of times of occurrence of the state B, and the sum of numbers of times of occurrences of the state A and the state B in a predetermined period are acquired by analyzing the occurrence states of the matching state and the free state based on the travel data. Then, the occurrence probabilities of the respective display states are acquired based on the above-mentioned equations. The probabilities may be calculated by acquiring occurrence states of the matching state and the free state which theoretically occur when the vehicle travels in addition to or in place of the occurrence states of the matching state and the free state based on the travel data.

The configurations of the conditional probability information, the display transition probability information, and the display occurrence probability information in FIGS. 4 to 8 are examples, and are not limited to the examples.

Referring back to FIG. 3, the free state determination part 40 acquires the values of the above-mentioned various parameters (position error, direction error, likelihood, GPS receptions state (number of times of continuous positioning), GPS signal strength, vehicle speed, altitude, and road surface inclination angle) from the sensor information acquisition part 10, the vehicle state calculation part 20, and the map matching processing part 30. Then, for each of the acquired parameters, the free state determination part 40 refers to the conditional probability information corresponding to the type of this parameter stored in the conditional probability information storage part 41, identifies a range including the value of the parameter, and acquires the probabilities appearing in the matching state and the free state associated with the range.

On this occasion, the probabilities that values $X_{1\ to\ n}$ of the parameters 1 to n appear in the state A (matching state) are represented as $P(X_{1\ to\ n}|A)$. Moreover, the probabilities that values $X_{1\ to\ n}$ of the parameters 1 to n appear in the state B (free state) are represented as $P(X_{1\ to\ n}|B)$.

Moreover, the free state determination part 40 acquires the display transition probability information from the display transition probability information storage part 42 depending on a previous determination result (information representing the matching state or the free state).

The free state determination part 40 acquires, when the previous determination result is the matching state, the transition probability from the matching state to the matching state, and the transition probability from the matching state to the free state. On the other hand, the free state determination part 40 acquires, when the previous determination result is the free state, the transition probability from the free state to the free state, and the transition probability from the free state to the matching state.

Moreover, the free state determination part 40 acquires the display occurrence probability information in the matching state and the free state from the display occurrence probability information storage part 43.

Then, the free state determination part 40 calculates probability indices for the respective display states used for the determination depending on the previous determination result (information representing the matching state or the free state). The probability index is calculated as a product of a product of the respective pieces of conditional probability information, the display transition probability information, and the display occurrence probability information as described later according to this embodiment.

When the previous determination result is the state A (matching state), the probability index for the state A is calculated by EQUATION (7), and the probability index for the state B (free state) is calculated by EQUATION (8).

(Probability index for state $A$)=$P$(transition from state $A$ to state $A$)×$P$(occurrence of state $A$)×$P$$(X_1|A)$× ... ×$P(X_n|A)$  EQUATION (7)

(Probability index for state $B$)=$P$(transition from state $A$ to state $B$)×$P$(occurrence of state $B$)×$P$$(X_1|B)$× ... ×$P(X_n|B)$  EQUATION (8)

On the other hand, when the previous determination result is the state B, the probability index for the state B is calculated by EQUATION (9), and the probability index for the state A is calculated by EQUATION (10).

(Probability index for state $B$)=$P$(transition from state $B$ to state $B$)×$P$(occurrence of state $B$)×$P$$(X_1|B)$× ... ×$P(X_n|B)$  EQUATION (9)

(Probability index for state $A$)=$P$(transition from state $B$ to state $A$)×$P$(occurrence of state $A$)×$P$$(X_1|A)$× ... ×$P(X_n|A)$  EQUATION (10)

Then, the free state determination part 40 compares the probability indices for the respective display states calculated as described above with each other. When the probability index in the free state is more than the probability index in the matching state, the free state determination part 40 determines that the display state is the free state, and otherwise determines that the display state is the matching state. This determination result is selected as the display state for this time.

The display control part 50 outputs various information such as a map and the current position to the display 110 for displaying. For example, the display control part 50 acquires map data within a predetermined range from the own vehicle position calculated by the vehicle state calculation part 20 from the map DB 1400, and displays the map data at a predetermined timing (such as at every predetermined distance). Moreover, if the route information set by the route guidance part 60 exists, the route information may be superimposed on the map data for displaying.

Moreover, for example, the display control part 50 acquires the determination result by the free state determination part 40 at a predetermined timing (such as at every predetermined distance). Then, when the determination result is the free state, the display control part 50 displays the current position at the own vehicle position calculated by the vehicle state calculation part 20. On the other hand, when the determination result is the matching state, the display control part 50 displays the current position at the map matching position calculated by the map matching processing part 30.

The route guidance part 60 generates route information, and performs route guidance. For example, when the route guidance part 60 receives a search instruction for a recommended route along with a start location, a destination location, search conditions, and the like via the input device 120 from the user of the navigation device 1, the route guidance part 60 refers to the map DB 1400, and searches for the recommended route from the start location to the destination location by means of, for example, Dijkstra's algorithm. Moreover, for example, the route guidance part 60 acoustically outputs various information such as a travel direction and a required period via the speaker 131 or controls the display to display various information via the display control part 50 during the guidance of the recommended route.

The functional configuration of the control device 100 in FIG. 3 is classified depending on main processing contents for the sake of easy understanding of the present invention. The classification method and the name of the components do not restrict the present invention. The configuration of the control device 100 may be further classified into a larger number of components depending on processing contents. Moreover, the configuration may be classified so that a single component can carry out more pieces of the processing. Moreover, the processing by each of the components may be carried out by a single piece of hardware or a plurality of pieces of hardware. Moreover, the processing by each of the components may be realized by a single program or a plurality of programs.

Figure 9:
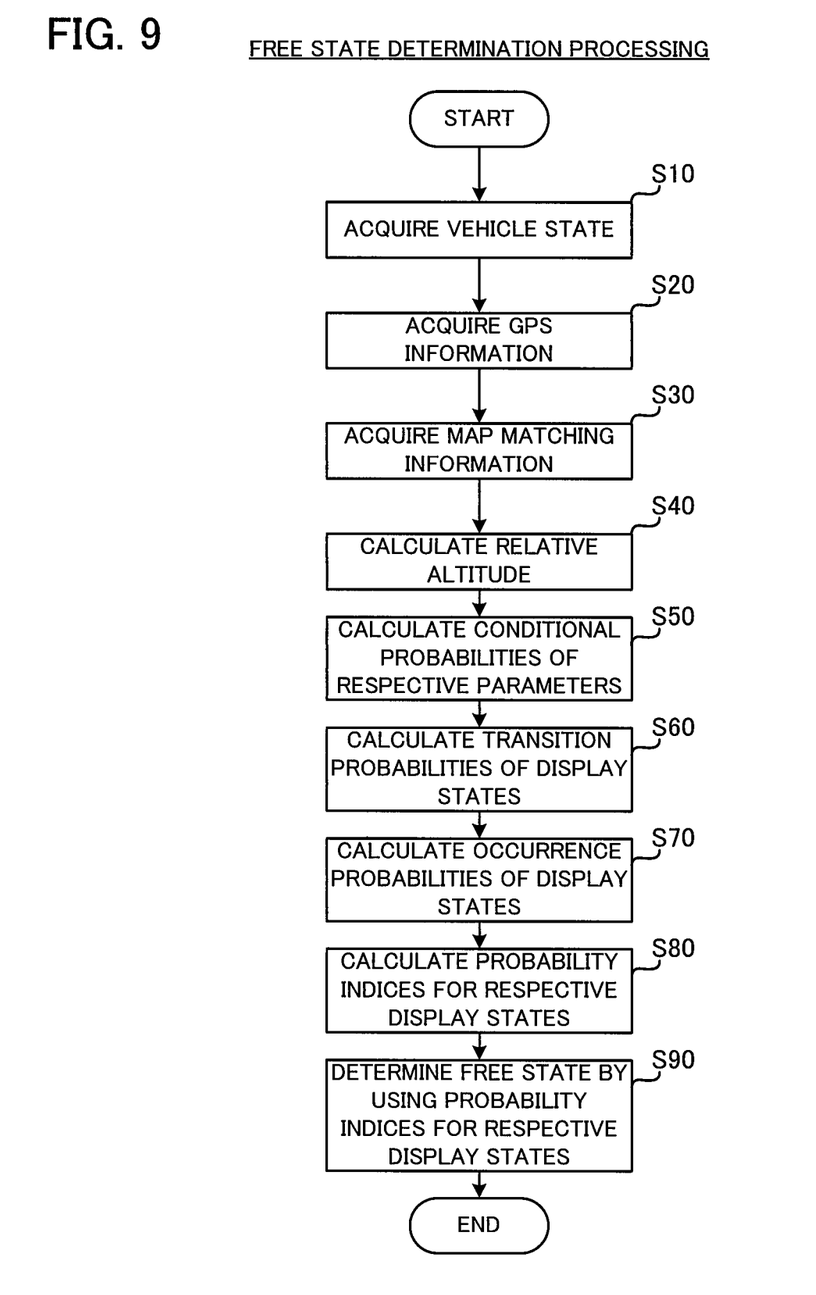
FIG. 9 is a flowchart of free state determination processing.

FIG. 9 is a flowchart of free state determination processing. This flow is carried out by the free state determination part 40 at a predetermined timing (such as at every predetermined distance).

First, the free state determination part 40 acquires the own vehicle speed, the road surface inclination angle, and the altitude change amount from the vehicle state calculation part 20 (S10). Moreover, the free state determination part 40 acquires the GPS reception state (number of times of continuous positioning) and the GPS signal strength from the sensor information acquisition part 10 (S20). Moreover, the free state determination part 40 acquires the position error, the direction error, and the likelihood calculated when the map matching position is identified from the map matching processing part 30 (S30).

Moreover, the free state determination part 40 calculates a relative altitude (S40). Specifically, when the previous determination result is the free state, the free state determination part 40 adds the altitude change amount acquired in Step S10 to the relative altitude calculated last time to calculate the relative altitude. On the other hand, when the previous determination result is the matching state, the free state determination part 40 calculates the relative altitude as 0. In other words, an altitude relative to a position (time point) in the last matching state as a reference is calculated in this step.

Then, the free state determination part 40 calculates the conditional probabilities for the respective parameters (position error, direction error, likelihood, GPS reception state (number of times of continuous positioning), GPS signal strength, vehicle speed, altitude (relative altitude), and road surface inclination angle) acquired or calculated in Steps S10 to S40 (S50). Specifically, for each of the parameters, the free state determination part 40 refers to the conditional probability information corresponding to the type of this parameter stored in the conditional probability information storage part 41, identifies a range including the value of this parameter, and acquires the probabilities appearing in the matching state and the free state associated with the range.

Moreover, the free state determination part 40 calculates the transition probabilities of the display state (S60). Specifically, the free state determination part 40 acquires, when the previous determination result is the matching state, the transition probability from the matching state to the matching state, and the transition probability from the matching state to the free state from the display transition probability information storage part 42. On the other hand, the free state determination part 40 acquires, when the previous determination result is the free state, the transition probability from the free state to the free state, and the transition probability from the free state to the matching state from the display transition probability information storage part 42.

Moreover, the free state determination part 40 calculates the occurrence probabilities of the display state (S70). Specifically, the free state determination part 40 acquires the display occurrence probability information for the matching state and the display occurrence probability information for the free state from the display occurrence probability information storage part 43.

Then, the free state determination part 40 calculates the probability indices for the respective display states (S80). Specifically, when the previous determination result is the matching state, the free state determination part 40 substitutes the respective probabilities acquired in Steps S50 to S70 into Equations (7) and (8), thereby calculating the probability index in the matching state and the probability index in the free state. On the other hand, when the previous determination result is the free state, the free state determination part 40 substitutes the respective probabilities acquired in Steps S50 to S70 into Equations (9) and (10), thereby calculating the probability index in the free state and the probability index in the matching state.

Then, the free state determination part 40 uses the probability indices for the respective display states calculated in Step S80 to make the free state determination (S90). Specifically, the free state determination part 40 compares the probability index in the matching state and the probability index in the free state with each other. When the probability index in the free state is more than the probability index in the matching state, the free state determination part 40 determines that the display state is the free state, and otherwise determines that the display state is the matching state.

After the processing in Step S90, the free state determination part 40 finishes the processing in this flowchart. The determination result in Step S90 is used by other functions such as the display control part 50.

The processing units in the flowchart in FIG. 9 are acquired by division depending on the major processing contents for easy understanding of the processing by the free state determination part 40. The division and the name of the processing units do not restrict the present invention. The processing by the free state determination part 40 can be further divided into a larger number of processing units depending on processing contents. Moreover, such a division that a single processing unit includes more pieces of processing is possible. Moreover, as long as the same free state determination can be provided, a processing sequence of the flowchart may not be limited to the illustrated processing sequence.

As described above, according to the embodiment of the present invention, the values of the vehicle information (various parameters) on the state of the vehicle are converted into the probabilities of the respective display states (the matching state and the free state), and the free state determination is made based on the probabilities. The free state determination at the higher precision can thus be made by means of the simpler mechanism.

Moreover, the probability indices for the respective display states can be calculated by the product of the probabilities corresponding to the respective parameters and the probabilities relating to the display, and a complex condition determination is not necessary. Moreover, for example, even when a parameter needs to be added or deleted, addition and deletion of the conditional probability information for the parameter, and addition and deletion of terms to and from the equations are easy, resulting in a reduction of man-hours required for maintenance and improvement.

The embodiment of the present invention is intended to not limit but exemplify the gist and scope of the present invention. For example, the following modification may be provided.

The conditional probability information for all the parameters is used according to the embodiment, but parameters to be used may be selected depending on a state. Values of the parameters to be used may be corrected depending on a state.

Specifically, for example, when a map matching position exists on a link of a tunnel, the free state determination part 40 is configured not to use the conditional probabilities of the GPS reception state and the GPS signal strength for the calculation of the probability indices for the respective display states (for example, substitutes "1" into the conditional probabilities for the GPS reception state and the GPS signal strength, and then calculates Equations (7) and (8), or Equations (9) and (10)). This is because such a determination that the display state is the matching state is made as much as possible when the vehicle is traveling in a tunnel.

Moreover, for example, when it is determined that the GPS signal is received under a state in which a negative altitude (relative altitude) is acquired, the free state determination part 40 is configured not to use the conditional probability for the altitude for the calculation of the probability indices for the respective display states. This is for preventing, when an error in calculation of the altitude occurs, the precision of the free state determination from degrading as much as possible.

Moreover, for example, when the value of the parameter is an abnormal value, the free state determination part 40 is configured not to use the conditional probability for this parameter for the calculation of the probability indices for the respective display states. This is for preventing, the precision of the free state determination from degrading by a failure of the sensor or the like as much as possible.

Moreover, for example, when a state where the GPS signal is not received changes to a state where the GPS signal is received, the free state determination part 40 may subtract a predetermined direction error value from the direction error between the own vehicle direction and the link direction acquired from the map matching processing part 30 during a predetermined period. This is because, for example, when a vehicle exits from a parking structure or the like, an error of the sensor accumulated during the travel in the parking structure is corrected, thereby preventing the precision of the free state determination from degrading as much as possible.

As a result of the above-mentioned configurations, the free state determination can be made at a high precision depending on the state of the vehicle.

Any two or more of the embodiment and the respective modified examples may be appropriately combined.

The present invention may be applied to not only the determination of the free state and the matching state, but also determination of other display states.

REFERENCE SIGNS LIST

1: navigation device, 100: control device, 101: CPU, 102: RAM, 103: ROM, 104: I/F, 110: display, 120: input device, 121: touch panel, 122: hardware switch, 130: sound input/output device, 131: speaker, 132: microphone, 140: storage device, 150: I/F device, 160: vehicle speed sensor, 161: gyro sensor, 162: GPS reception device, 170: FM broadcast reception device, 171: beacon reception device, 172: communication device, 180: vehicle onboard communication device, 1400: map DB, 1410: mesh ID, 1411: link data, 1412: link ID, 1413: coordinate information, 1414: type information, 1415: link length information, 1416: link travel period, 1417: connection link ID, 10: sensor information acquisition part, 20: vehicle state calculation part, 30: map matching processing part, 40: free state determination part, 41: conditional probability information storage part, 42: display transition probability information storage part, 43: display occurrence probability information storage part, 50: display control part, 60: route guidance part, 410: conditional probability information, 4101: partitioned range, 4102: probability, 4103: probability, 411: conditional probability information, 4111: partitioned range, 4112: probability, 4113: probability, 412: conditional probability information, 4121: partitioned range, 4122: probability, 4123: probability, 420: display transition probability information, 421: transition relationship, 422: probability, 430: display occurrence probability information, 431: display state, 432: probability

The invention claimed is:

1. A vehicle position detection device, comprising:
 a vehicle information acquisition part configured to acquire vehicle information on a state of an own vehicle; a current position of the own vehicle is determined using a GPS device;
 a conditional probability information storage part configured to store conditional probability information associating each of values to be taken in the vehicle information, a matching conditional probability that the each of the values occurs in a matching state where a position of the vehicle is map-matched to a link, and a free conditional probability that the each of the values occurs in a free state where the position of the vehicle is not map-matched to a link with one another;
 a probability index calculation part configured to acquire, using the conditional probability information, the matching conditional probability and the free conditional probability corresponding to a value of the vehicle information acquired by the vehicle information acquisition part, to calculate a probability index in the matching state based on the acquired matching conditional probability, and to calculate a probability index in the free state based on the acquired free conditional probability; and
 a state determination part configured to determine whether the free state or the matching state is to be selected based on the probability index in the matching state and the probability index in the free state calculated by the probability index calculation part, wherein
 when the free state is determined, a position calculated as a current position of the own vehicle is output to a display device, and
 when the matching state is determined a map matching position of the own vehicle is output as a current position of the own vehicle to the display device.

2. The vehicle position detection device according to claim 1, wherein:
 the conditional probability information is acquired by partitioning the values to be taken in the vehicle information into one or more ranges, and associating, for each partitioned range, the matching conditional probability that a value included in the partitioned range occurs in the matching state and the free conditional probability that the value included in the partitioned range occurs in the free state with the partitioned range; and
 the probability index calculation part is configured to acquire, using the conditional probability information, the matching conditional probability and the free conditional probability corresponding to a range including the value of the vehicle information acquired by the vehicle information acquisition part.

3. The vehicle position detection device according to claim 1, wherein:
 the vehicle information acquisition part is configured to acquire one or more pieces of vehicle information;
 the conditional probability information storage part is configured to store the conditional probability information for each of the one or more pieces of vehicle information; and
 the probability index calculation part is configured to acquire the matching conditional probability and the free conditional probability for each of the one or more pieces of vehicle information, to calculate the probability index in the matching state based on the acquired matching conditional probability for each of the one or more pieces of vehicle information, and to calculate the probability index in the free state based on the acquired free conditional probability for each of the one or more pieces of vehicle information.

4. The vehicle position detection device according to claim 1, further comprising a transition probability information storage part configured to store, for each relationship of a state transition, including a transition to the same state, between the matching state and the free state, a transition probability that the state transition of the relationship occurs,
wherein the probability index calculation part is configured to calculate the probability index in the matching state based on the acquired matching conditional probability and the acquired transition probability of the transition to the matching state, and to calculate the probability index in the free state based on the acquired free conditional probability and the acquired transition probability of the transition to the free state.

5. The vehicle position detection device according to claim 4, wherein the probability index calculation part is configured to:
acquire, when the state previously selected by the state determination part is the matching state, the transition probability from the matching state to the matching state, and the transition probability from the matching state to the free state; and
acquire, when the state previously selected by the state determination part is the free state, the transition probability from the free state to the free state, and the transition probability from the free state to the matching state.

6. The vehicle position detection device according to claim 4, further comprising an occurrence probability information storage part configured to store a matching occurrence probability that the matching state occurs in a predetermined period and a free occurrence probability that the free state occurs in the predetermined period,
wherein the probability index calculation part is configured to calculate the probability index in the matching state based on the acquired matching conditional probability, the acquired transition probability of the transition to the matching state, and the acquired matching occurrence probability, and to calculate the probability index in the free state based on the acquired free conditional probability, the acquired transition probability of the transition to the free state, and the acquired free occurrence probability.

7. The vehicle position detection device according to claim 1, wherein the vehicle information comprises at least one of a position error, a direction error, a likelihood, a number of times of continuous GPS positioning, a GPS signal strength, a vehicle speed, an altitude, or a road surface inclination angle.

8. The vehicle position detection device according to claim 1, wherein the probability index calculation part is configured to select the vehicle information used for calculating the probability index, or to correct the value of the vehicle information depending on the state of the own vehicle.

9. A non-transitory computer-readable storage medium storing program for a vehicle position detection device, which when executed causes a processor to:

acquire vehicle information on a state of an own vehicle;
determine the current position of the own vehicle using a GPS device;
store conditional probability information associating each of values to be taken in the vehicle information, a matching conditional probability that the each of the values occurs in a matching state where a position of the vehicle is map-matched to a link, and a free conditional probability that the each of the values occurs in a free state where the position of the vehicle is not map-matched to a link with one another;
a acquire, using the conditional probability information, the matching conditional probability and the free conditional probability corresponding to a value of the vehicle information acquired, to calculate a probability index in the matching state based on the acquired matching conditional probability, and to calculate a probability index in the free state based on the acquired free conditional probability; and
determine whether the free state or the matching state is to be selected based on the probability index in the matching state and the probability index in the free state calculated by the probability index calculation part, wherein
when the free state is determined, the processor outputs to a display device a position calculated as a current position of the own vehicle, and
when the matching state is determined, the processor outputs to the display device a map matching position of the own vehicle as a current position of the own vehicle.

10. A vehicle position detection device, comprising:
a processor configured to acquire vehicle information on a state of an own vehicle, wherein the processor is also configured to determine the current position of the own vehicle using a GPS device;
store conditional probability information associating each of values to be taken in the vehicle information, a matching conditional probability that the each of the values occurs in a matching state where a position of the vehicle is map-matched to a link, and a free conditional probability that the each of the values occurs in a free state where the position of the vehicle is not map-matched to a link with one another;
acquire, using the conditional probability information, the matching conditional probability and the free conditional probability corresponding to a value of the vehicle information, to calculate a probability index in the matching state based on the acquired matching conditional probability, and to calculate a probability index in the free state based on the acquired free conditional probability; and
determine whether the free state or the matching state is to be selected based on the probability index in the matching state and the probability index in the free state,
when the free state is determined, the processor outputs to a display device a position calculated as a current position of the own vehicle, and
when the matching state is determined, the processor outputs to the display device a map matching position of the own vehicle as a current position of the own vehicle.

11. The vehicle position detection device according to claim 10, wherein:
the conditional probability information is acquired by partitioning the values to be taken in the vehicle information into one or more ranges, and associating, for each partitioned range, the matching conditional probability that a value included in the partitioned range occurs in the matching state and the free conditional probability that the value included in the partitioned range occurs in the free state with the partitioned range; and the processor also acquires, using the conditional probability information, the matching conditional probability and the free conditional probability corresponding to a range including the value of the vehicle information acquired by the vehicle information acquisition part.

12. The vehicle position detection device according to claim 10, wherein:

the processor acquires one or more pieces of vehicle information;

the processor stores the conditional probability information for each of the one or more pieces of vehicle information; and the processor acquires the matching conditional probability and the free conditional probability for each of the one or more pieces of vehicle information, to calculate the probability index in the matching state based on the acquired matching conditional probability for each of the one or more pieces of vehicle information, and to calculate the probability index in the free state based on the acquired free conditional probability for each of the one or more pieces of vehicle information.

13. The vehicle position detection device according to claim 10, wherein the processor stores, for each relationship of a state transition, including a transition to the same state, between the matching state and the free state, a transition probability that the state transition of the relationship occurs, wherein the processor calculates the probability index in the matching state based on the acquired matching conditional probability and the acquired transition probability of the transition to the matching state, and to calculate the probability index in the free state based on the acquired free conditional probability and the acquired transition probability of the transition to the free state.

14. The vehicle position detection device according to claim 13, wherein the processor is also configured to:

acquire, when the state previously selected is the matching state, the transition probability from the matching state to the matching state, and the transition probability from the matching state to the free state; and acquire, when the state previously selected is the free state, the transition probability from the free state to the free state, and the transition probability from the free state to the matching state.

15. The vehicle position detection device according to claim 13, wherein the processor also stores a matching occurrence probability that the matching state occurs in a predetermined period and a free occurrence probability that the free state occurs in the predetermined period, wherein the processor calculates the probability index in the matching state based on the acquired matching conditional probability, the acquired transition probability of the transition to the matching state, and the acquired matching occurrence probability, and to calculate the probability index in the free state based on the acquired free conditional probability, the acquired transition probability of the transition to the free state, and the acquired free occurrence probability.

16. The vehicle position detection device according to claim 10, wherein the vehicle information comprises at least one of a position error, a direction error, a likelihood, a number of times of continuous GPS positioning, a GPS signal strength, a vehicle speed, an altitude, or a road surface inclination angle.

17. The vehicle position detection device according to claim 10, wherein the processor selects the vehicle information used for calculating the probability index, or to correct the value of the vehicle information depending on the state of the own vehicle.

* * * * *